United States Patent [19]

Abe et al.

[11] Patent Number: 5,475,054
[45] Date of Patent: Dec. 12, 1995

[54] RESIN COMPOSITION COMPRISING POLYPHENYLENE ETHER, POLYOLEFIN RESIN AND ALIPHATIC POLYCARBOXYLIC ACIDS

[75] Inventors: Hiroomi Abe, Chiba; Kenji Nagaoka; Takashi Sanada, both of Ichihara, all of Japan

[73] Assignee: Sumitomo Chemical Company, Limited, Osaka, Japan

[21] Appl. No.: 314,436

[22] Filed: Sep. 28, 1994

Related U.S. Application Data

[60] Continuation of Ser. No. 107,013, Aug. 17, 1993, abandoned, which is a division of Ser. No. 929,504, Aug. 18, 1992, abandoned, which is a continuation of Ser. No. 623,081, Dec. 6, 1990, abandoned.

[51] Int. Cl.$^6$ .............................. C08L 23/00; C08L 71/12
[52] U.S. Cl. .................. 525/68; 525/92 B; 525/132; 525/133; 525/149; 525/397; 525/905
[58] Field of Search .................. 525/68, 92, 132, 525/133, 149, 397, 905

[56] References Cited

U.S. PATENT DOCUMENTS

| | | | |
|---|---|---|---|
| 4,547,541 | 10/1985 | Golba, Jr. | 525/92 |
| 4,806,297 | 2/1989 | Brown et al. | 525/92 |
| 4,873,286 | 10/1989 | Gallucci et al. | 525/92 |
| 4,916,185 | 4/1990 | Yates, III et al. | 525/67 |
| 4,972,021 | 11/1990 | Lee, Jr. | 525/132 |
| 5,017,656 | 5/1991 | Bopp | 525/132 |
| 5,086,105 | 2/1992 | Abe et al. | 525/68 |
| 5,102,591 | 4/1992 | Hasson et al. | 525/132 |
| 5,182,151 | 1/1993 | Furata et al. | 525/133 |

FOREIGN PATENT DOCUMENTS 3117049  5/1988  Japan ................... 525/132

*Primary Examiner*—Thomas Hamilton, III
*Attorney, Agent, or Firm*—Stevens, Davis, Miller & Mosher

[57] ABSTRACT

A resin composition comprising (A) a polyphenylene ether resin, (B) a polyolefin resin, and optionally (C) an elastomer, and (D) an aliphatic polycarboxylic acid derivative represented by the following general formula:

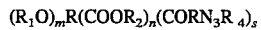

$$(R_1O)_mR(COOR_2)_n(CORN_3R_4)_s$$

wherein R represents a saturated hydrocarbon group having 2 to 20 carbon atoms with a linear or branched chain; $R_1$ represents a hydrogen atom or an alkyl, aryl, acyl or carbonyldioxy group having 1 to 10 carbon atoms; each $R_2$ represents a hydrogen atom or an alkyl or aryl group having 1 to 20 carbon atoms; $R_3$ and $R_4$ each represents a hydrogen atom or an alkyl or aryl group having 1 to 10 carbon atoms; m represents a number equal to 1 or 2; (n+s) is larger than or equal to 2 and, n and s are each larger than or equal to 0; $(OR_1)$ is in an alpha or beta position with respect to a carbonyl group, and in which at least two carbonyl groups are separated by 2 to 6 carbon atoms.

1 Claim, No Drawings

RESIN COMPOSITION COMPRISING POLYPHENYLENE ETHER, POLYOLEFIN RESIN AND ALIPHATIC POLYCARBOXYLIC ACIDS

This application is a continuation of application Ser. No. 08/107,013, filed Aug. 17, 1993, now abandoned; which in turn is a division of application Ser. No. 07/929,504, filed Aug. 18, 1992, now abandoned; which in turn is a continuation of application Ser. No. 07/623,081, filed Dec. 6, 1990, now abandoned.

BACKGROUND OF THE INVENTION

1. Field of the Invention

This invention relates to a resin composition, and more particularly to a resin composition comprising a polyphenylene ether resin and a polyolefin resin as its main ingredients and having enhanced mechanical properties, particularly impact resistance.

2. Description of the Prior Art

Polyphenylene ether resin is useful because of its excellent mechanical and electrical properties and high heat resistance. However, it has a fault that it is inferior in moldability and solvent resistance, due to which the use of polyphenylene ether resin itself is greatly restricted.

On the other hand, polyolefin resins and particularly crystalline polyolefin resins are characterized by their low density and inexpensiveness, in addition to their excellence in moldability and solvent resistance, owing to which they are widely used practically as molded articles and films. However, such polyolefin resins have a fault that they are poor in heat resistance, and this fault greatly obstructs a further expansion of their use.

Under such a situation, it is industrially valuable to blend together a polyphenylene ether resin and a polyolefin resin, both having respective excellent characteristic features, to prepare a resin composition having the advantageous points of both the resins. Thus, resin compositions comprising a polyolefin resin and a polyphenylene ether resin have already been proposed in Japanese Patent Application Kokoku (Post. Exam.) No. 42-7069, Japanese Patent Application Kokai (Laid-Open) No. 2-115248, etc.

Generally speaking, however, polyphenylene ether resin and polyolefin resin are low in mutual affinity, and a sufficiently compatible mixture cannot be prepared by merely blending them together.

As resin compositions overcoming such a fault, there have been proposed a resin composition containing an acid-modified polyolefin resin and a polyphenylene ether resin (Japanese Patent Application Kokai (Laid-Open) No. 60-120748), a resin composition comprising a modified polyolefin resin and a modified polyphenylene ether resin (Japanese Patent Application Kokai (Laid-Open) No. 63-128056), etc.

In these resin compositions so far proposed, however, compatibility is insufficient, and their mechanical properties such as impact resistance are unsatisfactory, even though they are improved in solvent resistance, moldability, etc.

SUMMARY OF THE INVENTION

The object of this invention is to provide a resin composition excellent in mechanical properties, particularly impact resistance, comprising as its main resin ingredients a polyphenylene ether resin characterized by its high heat resistance and a polyolefin resin characterized by its high solvent resistance and economical nature.

With the aim of achieving the above-mentioned object, the present inventors conducted elaborate studies to find that, if a specified organic compound is compounded with a polyphenylene ether resin and a polyolefin resin, there can be obtained a resin composition having a high compatibility. Based on this finding, this invention was accomplished.

Thus, this invention provides a resin composition comprising (A) a polyphenylene ether resin, (B) a polyolefin resin, optionally (C) an elastomer, and (D) an aliphatic polycarboxylic acid derivative represented by the following general formula:

$(R_1O)_m R(COOR_2)_n (CORN_3R_4)_s$ wherein R represents a saturated hydrocarbon group having 2–20 carbon atoms with a linear or branched chain, $R_1$ represents a hydrogen atom or an alkyl, aryl, acyl or carbonyldioxy group having 1 to 10 carbon atoms, each $R_2$ represents a hydrogen atom or an alkyl or aryl group having 1 to 20 carbon atoms, $R_3$ and $R_4$ each represents a hydrogen atom or an alkyl or aryl group having 1 to 10 carbon atoms, m represents a number equal to 1 or 2, (n+s) is larger than or equal to 2, n and s are each larger than or equal to 0, group $(OR_1)$ is in an alpha or beta position with respect to a carbonyl group and at least two carbonyl groups are separated by 2 to 6 carbon atoms.

DETAILED DESCRIPTION OF THE INVENTION

As used herein, the term "polyphenylene ether resin (A)" means a polymer constituted of a recurring unit represented by the following general formula:

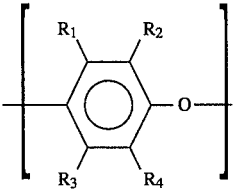

wherein $R_1$, $R_2$, $R_3$ and $R_4$ each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, ester group, amido group, ether group, sulfide group, sulfone group and the like.

Concrete examples of said polyphenylene ether resin include poly(2,6-dimethyl-1,4-phenylene ether), poly(2,6-diethyl-1,4-phenylene ether), poly( 2-methyl-6-ethyl-1,4-phenylene ether), poly( 2-methyl-6-propyl- 1,4-phenylene ether), poly(2,6-dipropyl-1,4-phenylene ether), poly(2-ethyl-6-propyl-1,4-phenylene ether), poly(2,6-dibutyl-1,4-phenylene ether), poly( 2,6-diproponyl-1,4-phenylene ether), poly( 2,6-dilauryl-1,4-phenylene ether), poly(2,6-diphenyl-1,4-phenylene ether), poly(2,6-dimethoxy-1,4-phenylene ether), poly( 2,6-diethoxy-1,4-phenylene ether), poly(2-methoxy- 6-ethoxy- 1,4-phenylene ether), poly(2-ethyl-6-stearyloxy- 1,4-phenylene ether), poly(2-methyl-6-phenyl-1,4-phenylene ether), poly(2-methyl-1,4-phenylene ether), poly( 2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl- 1,4-phenylene ether), and various copolymers having plural kinds of recurring units constituting these polymers. The copolymers also include copolymers formed between poly-substituted phenols such as 2,3,6-trimethylphenol, 2,3,5,6-tetramethylphenol and the like and 2,6-dimethylphenol, and the like. The "polyphenylene ether resin" referred to in this invention also includes graft-modified products of polyphenylene ether resin prepared by graft-modifying the above-mentioned polyphenylene ether resins with a styrene type monomer such as styrene, α-methylstyrene and the like. Among these polyphenylene ether resins, poly(2,6-dimethyl-1,4-phenylene ether) and 2,6-dimethylphenol/2,3,6-trimethylphenol copolymer are preferable.

Although molecular weight of the polyphenylene ether resin usable in this invention cannot be simply specified because desirable molecular weight range varies depending on the purpose, it is usually 0.1 to 0.7 dl/g and preferably 0.2 to 0.6 dl/g, as expressed in terms of intrinsic viscosity measured in chloroform at 30° C.

The process for producing such polyphenylene ether resins is well known and mentioned in, for example, U.S. Pat. Nos. 3306874, 3306875 and 3257357, Japanese Patent Application Kokoku (Post. Exam.) No. 52-17880, Japanese Patent Application Kokai (Laid-Open) Nos. 50-51197 and 1-304119, etc.

As used herein, the term "polyolefin resin (B)" inclusively means homopolymers and copolymers of olefins including α-olefins such as ethylene, propylene, butene-1, pentene-1, hexene-1, 3-methylbutene-1, 4-methylpentene-1, octene-1, decene-1, dodecene-1, tetradecene-1, hexadecene-1, octadecene-1, eicosene-1 and the like, cyclic olefins mentioned in japanese Patent Application Kokai (Laid-Open) No. 2-115248, and the like. Copolymers prepared by copolymerizing an olefin with a small quantity of other unsaturated monomer, and modified products of said copolymers and the above-mentioned olefin homopolymers and copolymers prepared by oxidation, halogenation, sulfonation and the like of polymer are also included in the polyolefin resin of this invention.

Examples of the above-mentioned unsaturated monomer copolymerizable with an olefin include unsaturated organic acids and their derivative such as acrylic acid, methacrylic acid, maleic acid, itaconic acid, methyl acrylate, methyl methacrylate, maleic anhydride, arylmaleic acid imide, alkylmaleic acid imide and the like; vinyl esters such as vinyl acetate, vinyl butyrate and the like; aromatic vinyl compounds such as styrene, methylstyrene and the like; vinylsilanes such as vinyltrimethylmethoxysilane, γ-methacryloyloxypropyltrimethoxysilane and the like; non-conjugated dienes such as dichclopentadiene, 4-ethylidene-2-norbornene, 4-methyl- 1,4-hexadiene, 5-methyl-1,4-hexadiene and the like; etc. Among the polyolefins mentioned above, copolymers of which more than 50% by weight is constituted of ethylene, propylene, butene-1, 3-methylbutene-1 or 4-methylpentene-1 and homopolymers of these monomers are preferable, and crystalline propylene type polymers such as propylene homopolymer, propylene-ethylene block or random copolymer and the like are more preferable.

Although molecular weight range of the polyolefin resin cannot be simply specified because desirable molecular weight range varies with the purpose, the molecular weight is usually in the range of 0.01 to 400 g/10 minutes and preferably 0.15 to 60 g/10 minutes, as expressed in terms of melt flow rate (MFR) measured at a temperature of 230° C. under a load of 2.16 kg/cm$^2$.

The above-mentioned polyolefin resin can be produced by hitherto known methods such as polymerization or modification. Commercial products are also extensively available, and they can also be used after an appropriate selection.

When a resin composition having a more enhanced impact strength is required in this invention, it is desirable to incorporate an elastomer (C) into the composition.

Examples of said elastomer include natural rubber, polybutadiene rubber, polyisoprene rubber, butyl rubber, ethylene-propylene copolymer rubber, butadiene-styrene copolymer rubber, butadiene-acrylonitrile copolymer rubber, hydrogenated and non-hydrogenated styrene-conjugated diene block copolymer rubber, polyester rubber, acrylic rubber, silicone rubber and the like and their modified products.

Among them, preferable elastomers are diene-copolymerized terpolymers, ethylene-propylene copolymer rubbers containing a graft copolymer prepared by graft copolymerizing an unsaturated monomer such as styrene and the like, and styrene-conjugated diene block copolymer rubbers such as styrene-isoprene diblock copolymer, styrene-butadiene triblock copolymer and the like including hydrogenated products thereof such as partially hydrogenated products thereof.

In this invention, the aliphatic polycarboxylic acid derivative (D) which is the central component of this invention functioning as a compatibility improver between polyphenylene ether resin and polyolefin resin is an aliphatic polycarboxylic acid or derivative thereof including its salts, acid amide or ester represented by the following general formula:

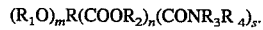

In the formula mentioned above, R represents a saturated hydrocarbon group having 2 to 20 carbon atoms with a linear or branched chain; $R_1$ represents a hydrogen atom, an alkyl, aryl, acyl or carbonyldioxy group having 1 to 10 carbon atoms; each $R_2$ represents a hydrogen atom or an alkyl or aryl group having 1 to 20 carbon atoms; $R_3$ and $R_4$ each represents a hydrogen atom or an alkyl or aryl group having 1 to 10 carbon atoms; m represents a number equal to 1 or 2; (n+s) is larger than or equal to 2, and n and s are each larger than or equal to 0; ($OR_1$) is in an alpha or beta position with respect to a carbonyl group, and at least two carbonyl groups are separated by 2 to 6 carbon atoms.

Concrete examples of such an aliphatic polycarboxylic acid derivative (D) include oxycarboxylic acids exemplified by citric acid, malic acid, tartaric acid, agaricic acid and the like; oxycarboxylic acid salts such as calcium citrate, calcium malate, potassium citrate, potassium malate and the like; esters of oxycarboxylic acids such as acetyl citrate, stearyl citrate, distearyl citrate, acetyl malate, stearyl malate and the like; oxycarboxylic acid amides such as N,N'-diethylcitric acid amide, N,N'-dipropylcitric acid amide, N-phenylcitric acid amide, N-dodecylcitric acid amide, N,N'-didodecylcitric acid amide, N-dodecylmalic acid amide and the like; etc. Among them, oxycarboxylic acids are preferable, and citric acid and malic acid are more preferable.

In some cases, the aliphatic polycarboxylic acid derivative (D) of this invention gives a better result when used in combination with an alkenyl-aromatic hydrocarbon such as styrene, α-methylstyrene and the like.

The aliphatic polycarboxylic acid derivative (D) of this invention can be used in combination with hitherto known modifiers such as those mentioned in Japanese Patent Application Kokai (Laid-Open) No. 63-128056, without any trouble.

The resin composition of this invention can be produced by the conventional method used for blending thermoplastic resins, such as melting and kneading, dissolution and mixing, etc. As for the order of mixing the ingredients, various cases can be adopted. For example, (1) all the ingredients are mixed together at once, or (2) one or both of polyphenylene ether resin (A) and polyolefin resin (B) are (is) separately mixed with aliphatic polycarboxylic acid derivative (D) to prepare their modified products previously and thereafter other ingredients are mixed thereto, etc.

As the method for producing the resin composition of this invention, melting and kneading is preferable. As for the order of the kneading, an embodiment which comprises mixing and kneading polycarboxylic acid derivative (D) together with at least a part of polyphenylene ether resin (A) and at least a part of polyolefin resin (B) is preferable. As the method of kneading, various hitherto known methods can be adopted. For example, the above-mentioned ingredients are mixed together by the use of known mixing means used for mixing a resin with other resin or a resin with a liquid or solid additive such as Henschel mixer, Supermixer, ribbon blender, V blender and the like to make a uniform mixture and thereafter the mixture is kneaded by the use of a kneading means such as Banbury mixer, Plastomill, Brabender Plastograph, single screw or twin screw extruder or the like.

Temperature of the kneading is selected from a range of 150° to 400° C. and preferably 200° to 350° C. It is sometimes preferable to carry out the kneading in the presence of a radical generator, in order to obtain a more uniform resin composition.

Examples of said radical generator include halogenated imides such as N-bromosuccinimide and the like, organic peroxides such as benzoyl peroxide, dicumyl peroxide, di-t-butyl peroxide, cumene hydroperoxide, 2,5-dimethyl-2,5-di(peroxybenzoate)-hexine-3, 1,3-bis-(t-butylperoxyisopropyl)-benzene, lauroyl peroxide, t-butyl peracetate and the like, persulfates such as potassium persulfate, ammonium persulfate and the like, diazo compounds such as azobisisobutyronitrile, 1,1'-azobis(cyclohexanecarbonitrile) and the like, etc.

When such a radical generator is used, its amount is usually 10 parts by weight or less and preferably 0.001 to 5 parts by weight per 100 parts by weight of the sum of polyphenylene ether resin (A), polyolefin resin (B) and optionally elastomer (C).

In the resin composition of this invention, the proportions of polyphenylene ether resin (A) and polyolefin resin (B) are not critical but they may be arbitrarily decided in accordance with purpose, namely the heat resistance and flowability requested for the composition. Generally speaking, however, their proportion is usually 99:1 to 1:99 and preferably 5:95 to 80:20 as expressed in terms of the ratio [% by weight of polyphenylene ether resin A)]:[% by weight of polyolefin resin (B)] based on the total weight of polyphenylene ether resin (A) and polyolefin resin (B).

If desired, the resin composition of this invention can contain elastomer (C) mentioned above. Proportion of elastomer (C) is usually 70% by weight or less and preferably 1 to 50% by weight, based on the total weight of polyphenylene ether resin (A), polyolefin resin (B) and elastomer (C).

As for the amount of the aliphatic polycarboxylic acid derivative (D) in this invention, its preferable range cannot be simply decided because its effect varies not only with the kind of itself but also with kinds of the used polyphenylene ether resin (A) and polyolefin resin (B) and their proportions. Generally speaking, however, 0.1 to 30 parts by weight, preferably 0.2 to 20 parts by weight, of aliphatic polycarboxylic acid derivative (D) is used per 100 parts by weight of the total weight of polyphenylene ether resin (A), polyolefin resin (B) and optionally elastomer (C).

If desired, the resin composition of this invention may contain a wide variety of substances other than the above. Examples of said "other substances" which are added for particular purposes include bonding agent, other resins, flame retardant, stabilizer, plasticizer, lubricant, pigment, reinforcing fiber, filler, etc.

As examples of the bonding agent, the followings can be referred to: the compounds mentioned in Japanese Patent Application Kokai (Laid-Open) No. 63-128056 such as diamines, dicarboxylic acids, diepoxy compounds, diols and the like; diisocyanates such as diphenylmethane diisocyanate, hexamethylene diisocyanate and the like; bisoxazolines such as 2,2'-bis(2-oxazoline) and the like; etc.

Examples of said "other resin" include poly(alkenyl aromatics) such as polystyrene, ABS resin and the like; polyamides such as nylon-6, nylon-66, nylon-12 and the like; polyamide-imides; polyesters; polycarboxylic esters such as polymethyl methacrylate and the like; polyvinyl halogenides such as polyvinyl chloride, polyvinylidene chloride and the like; etc.

Examples of the flame retardant include phosphoric esters exemplified by triphenyl phosphate, tricresyl phosphate, a phosphate obtained from a mixture of isopropylphenol and phenol, a phosphate obtained from a mixture consisting of a bifunctional phenol such as benzohydroquinone or Bisphenol A and other alcohol or phenol, and the like; brominated compounds exemplified by decabromodiphenyl, pentabromotoluene, decabromodiphenyl ether, hexabromobenzene, brominated polystyrene, brominated epoxy resin and the like; nitrogen-containing compounds such as melamine, melamine triisocyanurate and the like; and inorganic substances such as red phosphorus, antimony trioxide, boron oxide and the like.

Concrete examples of the reinforcing fiber include inorganic fibers such as glass fiber, potassium titanate fiber, rock wool, carbon fiber and the like, organic fibers such as aromatic polyamide fiber, polybenzimidazole fiber and the like; and metallic fibers such as brass fiber, aluminum-zinc fiber and the like.

Concrete examples of the filler include inorganic fillers such as glass beads, milled glass fiber, asbestos, wallastnite, mica, talc, clay, calcium carbonate, magnesium hydroxide, silica, diatomaceous earth and the like, metallic fillers such as aluminum flake, zinc flake and the like; and organic fillers such as polyimide powder and the like.

As concrete examples of the stabilizer, sterically hindered phenols, organic phosphites, oxalic acid diazides, sterically hindered amines and the like can be referred to. As concrete examples of the pigment, titanium oxide, zinc sulfide and the like can be referred to. As concrete examples of the lubricant, polyethylene wax, paraffin and the like can be referred to.

The above-mentioned "other substances" may be used at any formulation in accordance with purpose. As a rough measure in its general use, however, said other resin is used in an amount of 500 parts by weight or less, said flame retardant is used in an amount of 30 parts by weight or less and preferably 1 to 20 parts by weight, said stabilizer is used in an amount of 20 parts by weight or less and preferably 0.001 to 10 parts by weight, said reinforcing fiber and filler are used both in an amount of 100 parts by weight or less and preferably 0.1 to 80 parts by weight, and said lubricant is used in an amount of 2 parts by weight or less, all per 100 parts by weight of the sum of polyphenylene ether resin (A), polyolefin resin (B) and optionally elastomer (C).

Next, this invention will be illustrated in more detail with reference to examples. This invention is by no means limited by these examples.

In the examples, tensile elongation and Izod impact strength (notched) were measured on test pieces (3.2 mm in thickness) prepared by injection molding, according to ASTM D638 and ASTM D256, respectively, at 23° C. and heat distortion temperature under load (HDT) was measured according to ASTM D648 under a load of 4.6 kg/cm$^2$.

Intrinsic viscosity of polyphenylene ether resin was measured with Ubbelohde viscometer in chloroform at 30° C.

Examples 1–9 and Comparative Example 1–2

By the use of Supermixer, 30 parts by weight of poly(2,6-dimethyl-1,4-phenylene ether) having an intrinsic viscosity of 0.40 dl/g, 70 parts by weight of polypropylene having MFR of 0.4 g/10 minutes (Sumitomo Noblen D501, manufactured by Sumitomo Chemical Co., Ltd.), 2 parts by weight of styrene, 1 part by weight of a radical generator composition prepared by dispersing 1,3-bis-(t-butylperoxy-isopropyl)-benzene into polypropylene up to a concentration of 8% by weight and the elastomer and aliphatic polycarboxylic acid derivative mentioned in Table 1 of which amounts (parts by weight) were as shown in Table 1 were mixed together.

While continuously feeding the mixture thus obtained into the first feeder of a 50 mm twin screw kneading extruder (TEM-50, manufactured by Toshiba Kikai K.K.) equipped with the first feeder, the first kneading zone, the second feeder, the second kneading zone, a vent and a cylinder head arranged in the mentioned order from the upstream side to the downstream side, the mixture was melted and kneaded at a barrel temperature of 260° C. to prepare a resin composition of this invention.

Tensile elongation and Izod impact strength of the resin composition were as shown in Table 1.

The resin composition of Example 1 had HDT of as high as 148° C.

Referential Example 1

In the same manner as in Example 1, 100 parts by weight of poly(2,6-dimethyl-1,4-phenylene ether), 1 part by weight of DL-malic acid, 2 parts by weight of styrene and 1 part by weight of the radical generator composition were mixed together by the use of Supermixer, and the mixture thus obtained was extruded by the use of the same twin screw kneading extruder as in Example 1 at a barrel temperature of 300° C. The extruded strand was pelletized to obtain a pelletized composition. It was named "preliminary kneaded product M-1".

Referential Example 2

A pelletized composition was prepared by repeating the procedure of Referential Example 1, except that the DL-malic acid was replaced with citric acid. It was named "preliminary kneaded product M-2".

Referential Example 3

In the same manner as in Example 1, 100 parts by weight of polypropylene, 1 part by weight of DL-malic acid, 2 parts by weight of styrene and 1 part by weight of the radical generator composition were mixed together by the use of Supermixer, and the mixture thus obtained was extruded by the use of the same twin screw kneading extruder as in Example 1 at a barrel temperature of 230° C. The extruded strand was pelletized to obtain a pelletized composition. It was named "preliminary kneaded product M-3".

Referential Example 4

A pelletized composition was prepared by repeating the procedure of Referential Example 3, except that the DL-malic acid was replaced with malic anhydride. It was named "preliminary kneaded product M-4".

Example 10

By the use of the same twin screw kneading extruder as in Example 1, a mixture consisting of 16 parts by weight of preliminary kneaded product M-1 obtained above, 64 parts by weight of preliminary kneaded product M-3 obtained above, 20 parts by weight of ethylene-propylene rubber (Esprene E111P, manufactured by Sumitomo Chemical Co., Ltd.) and 1 part by weight of hexamethylenediamine was extruded at a barrel temperature of 260° C. The extruded strand was pelletized to obtain a resin composition of this invention.

Tensile elongation and Izod impact strength of the resin composition were 160% and 28 kg·cm/cm, respectively.

Example 11

A pelletized resin composition was prepared by repeating the procedure of Example 10, except that the preliminary kneaded product M-1 was replaced with preliminary kneaded product M-2.

Tensile elongation and Izod impact strength of the resin composition were 145% and 25 kg·cm/cm, respectively.

Example 12

A pelletized resin composition was prepared by repeating the procedure of Example 10, except that the preliminary kneaded product M-3 was replaced with preliminary kneaded product M-4.

Tensile elongation and Izod impact strength of the resin composition were 170% and 29 kg·cm/cm, respectively.

TABLE 1

| No. | Elastomer Name | Elastomer Parts by wt. | Aliphatic polycarboxylic acid derivative Name | Aliphatic polycarboxylic acid derivative Parts by wt. | Tensile elongation (%) | Izod impact strength (kg · cm/cm) |
|---|---|---|---|---|---|---|
| Example 1 | — | — | DL-Malic acid | 1.18 | 8 | 3.2 |
| Example 2 | — | — | Citric acid | 1.68 | 7 | 3.0 |
| Example 3 | — | — | DL-Tartaric acid | 1.32 | 5 | 2.6 |
| Example 4 | — | — | Tri-n-butyl citrate | 3.17 | 4 | 2.2 |
| Example 5 | — | — | Diammonium citrate | 1.99 | 6 | 2.8 |
| Example 6 | EPR[a) ] | 33.3 | Citric acid | 2.24 | 110 | 7.5 |
| Example 7 | EPR[a) ] | 33.3 | DL-Malic acid | 1.57 | 130 | 8.0 |
| Example 8 | SEP[b) ] | 12 | DL-Malic acid | 1.34 | 12 | 16 |
| Example 9 | SEBS[c) ] | 12 | DL-Malic acid | 1.34 | 22 | 20 |
| Comparative Example 1 | — | — | — | — | 2 | 1.2 |
| Comparative Example 2 | EPR[a) ] | 33.3 | — | — | 5 | 2.8 |

Notes)
[a) ]Ethylene-propylene rubber (propylene content 27% by weight, Mooney viscosity at 121° C. = 33)
[b) ]Partially hydrogenated styrene-isoprene block copolymer (Kraton G 1701, manufactured by Shell Chem. Co., Ltd.)
[c) ]Partially hydrogenated styrene-butadiene-styrene block copolymer (Kraton G 1650, manufactured by Shell Chem. Co., Ltd.)

What is claimed is:

1. A process for producing a resin composition which consists of melting and kneading in the presence of a radical generator selected from the group consisting of halogenated imides, organic peroxides, persulfates and diazo compounds (A) a polyphenylene ether resin, (B) a polyolefin resin and (D) an aliphatic polycarboxylic acid derivative represented by the following general formula:

$$(R_1O)_m R(COOR_2)_n (CORN_3R_4)_s$$

wherein R represents a saturated hydrocarbon group having 2 to 20 carbon atoms with a linear or branched chain; $R_1$ represents a hydrogen atom or an alkyl, aryl, acyl or carbonyldioxy group having 1 to 10 carbon atoms; each $R_2$ represents a hydrogen atom or an alkyl or aryl group having 1 to 20 carbon atoms; $R_3$ and $R_4$ each represents a hydrogen atom or an alkyl or aryl group having 1 to 10 carbon atoms; m represents a number equal to 1 or 2; (n+s) is larger than or equal to 2, and n and s are each larger than or equal to 0; ($OR_1$) is in an alpha or beta position with respect to a carbonyl group, and at least two carbonyl groups are separated by 2 to 6 carbon atoms, wherein at least a part of (A), at least a part of (B) and at least a part of (D), are melted and kneaded simultaneously at a temperature of 150° to 400° C.

* * * * *